United States Patent

Peterli et al.

[15] 3,665,031
[45] May 23, 1972

[54] WATER-SOLUBLE PHENOLIC ANTIOXIDANTS

[72] Inventors: Hans Jakob Peterli; Ernst Keller, both of Baseland; Kurt Schwarzenbach, Basel, all of Switzerland

[73] Assignee: Ciba-Geigy Corporation, Ardsley, N.Y.

[22] Filed: Sept. 16, 1968

[21] Appl. No.: 762,374

[30] Foreign Application Priority Data

Sept. 20, 1967 Switzerland ..................13164/67

[52] U.S. Cl. ........................................260/507 R, 260/45.95
[51] Int. Cl. .....................................................C07c 143/52
[58] Field of Search.................................................260/507

[56] References Cited

UNITED STATES PATENTS 2,435,356  2/1948  Kaiser.....................................260/507
2,193,944  3/1940  Steindorff et al......................260/507

*Primary Examiner*—Daniel D. Horwitz
*Attorney*—Karl F. Jorda and Martin J. Spellman

[57] ABSTRACT

Water-soluble compounds of the general formula $$(A-Y-)_n Z(SO_3-M^-)_m$$

A represents the radical of a sterically hindered phenol of the benzene series.

Y represents a bridge wherein the acyclic bridging member contains a carboxylic acid amide group as chain member, Z represents an aliphatic radical or a carbocyclic aromatic radical, containing at most two mono- or bi- cyclic nuclei, $M^+$ represents one equivalent of a cation solvatizable by water, and $m$ and $n$ independently of each other represent 1 or 2, and their water soluble salts are disclosed as antioxidants useful for the stabilization of organic polymers containing basic groups against deterioration due to heat and/or oxygen. In contrast to known stabilizing agents, the novel compounds need not be incorporated into the polymerization or polycondensation process for producing the materials to be protected or into a melt of such materials but can be applied to the finished organic products in an after-treatment, for instance by drawing thereon from an aqueous bath.

Typical compounds of the invention are those of the formulas

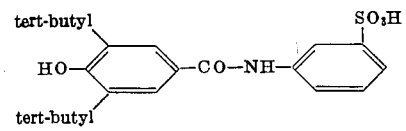

and

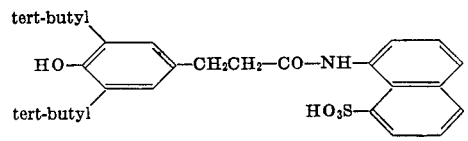

14 Claims, No Drawings

3,665,031

WATER-SOLUBLE PHENOLIC ANTIOXIDANTS

The invention concerns new, water soluble, non-coloring phenolic antioxidants, processes for the production thereof and their use for the stabilizing of organic polymers containing basic groups against the effect of heat and/or oxygen.

Organic polymers which contain basic groups such as polyamides, polyurethanes, polyureas or basically modified acrylonitrile and polypropylene polymers, are damaged, particularly at higher temperatures, by the effect of oxygen. The damage becomes apparent in that the relative viscosity of the polymers decreases and the strength and elasticity of the materials made therefrom, e.g. threads, bristles or foils, become worse. The polymers also become increasingly discolored.

Stabilizers are used to protect polymers which are sensitive to oxygen and/or heat. As such are used, e.g. for the stabilizing of polyamide, copper and manganese salts of inorganic or organic acids, derivatives of oxygen acids of phosphorus, aromatic amines or phenols. With other polymers, however, manganese and, particularly, copper salts accelerate oxidation and must be avoided at all costs. In this case, only organic stabilizers, particularly the aromatic amines and phenols which have an actual antioxidant action, are used for stabilization. Although the aromatic amines are good antioxidants having a favorable stabilizing effect, they give rise to great discolorations of the polymers. On the other hand, the stabilizing action of the phenols quickly diminishes at above 180° C; also they often disturb the polymerization if they are added before or during the production of the polymers. In addition, they are volatile and, therefore, in time lose their stabilizing action.

Also, the metal salts of copper and manganese used for stabilizing polyamide can give rise to discolorations. In particular, however, copper salts can easily be washed out if they are applied to the polymeric material only by a subsequent treatment from an aqueous bath. In addition, such metal salts can have a very injurious influence on other polymeric materials when polyamide treated therewith comes into contact with certain other polymeric materials and the salts diffuse into such materials. An example of this is the accelerated breakdown of rubber in contact with polyamide tire cord which has been treated with copper salts which can diffuse.

It has now been found that compounds of the general formula

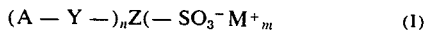

$$(A - Y -)_n Z(- SO_3^- M^+)_m \qquad (I)$$

wherein
- A represents the radical of a sterically hindered phenol of the benzene series,
- Y represents a bridge in which the acyclic bonding member contains a carboxylic acid amide group as chain member,
- Z represents an aliphatic or a carbocyclic aromatic radical, the latter containing at most two mono- or di-cyclic nuclei,
- $m$ and $n$ independently of each other represent 1 or 2, and
- $M^+$ represents one equivalent of a cation solvatizable by water, e.g. hydrogen ion, alkali metal ion, etc. suitable for the stabilization of polymers containing basic groups, which polymers are sensitive to heat and/or oxygen.

In formula I, A represents, e.g. a monohydroxyphenyl radical in which at least one o-position to the hydroxyl group is substituted by an alkyl, cycloalkyl or aralkyl group. Optionally this radical can have further substituents.

Alkyl groups in o-position to the hydroxyl group of A can be straight or branch chained and can contain one to 12, preferably four to eight carbon atoms. α-branch chained alkyl groups are preferred. Examples are the methyl, ethyl, isopropyl, tert.butyl, isoamyl, octyl, tert.octyl and dodecyl group. The tert.butyl group is particularly preferred.

Cycloalkyl groups in o-position to the hydroxyl group of A contain six to 10, preferably six to eight carbon atoms. Examples thereof are the cyclohexyl, methylcyclohexyl and cyclooctyl group.

Aralkyl groups in o-position to the hydroxyl group of A contain seven to 10, preferably eight to nine, carbon atoms. Examples thereof are the α-methyl- and the α,α-dimethylbenzyl group.

The radical A can also be substituted by other alkyl, cycloalkyl or aralkyl groups as defined above. These are preferably in o'- or p- position to the hydroxyl groups provided these positions are not occupied by the bond to Y. It is also of advantage of at least one m-position to the hydroxyl group is unsubstituted whilst the other can be substituted by low alkyl groups such as the methyl group.

In Formula I, Y represents, more particularly, a radical of the formula

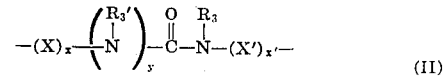

$$-(X)_x \!-\!\!\left(\!\!\begin{array}{c}R_3'\\|\\N\end{array}\!\!\right)_{\!\!y}\!\!-\!\overset{O}{\overset{\|}{C}}-\overset{R_3}{\underset{|}{N}}-(X')_{x'}- \qquad (II)$$

wherein
- X and X' independently of each other represent alkylene, oxaalkylene or thia-alkylene,
- $R_3$ and $R_3'$ independently of each other represent hydrogen or an optionally substituted alkyl group, and
- $x$, $x'$ and $y$ independently of each other each represent 0 or 1.

X and X' in Y can be straight or branch chained and can contain one to eight, preferably one to five carbon atoms. Examples thereof are methylene, ethylene, trimethylene, propylene, 2-thia-methylene or the 2-oxa-pentamethylene radical.

Particularly preferred compounds are those in which, in each of the radicals X and X', two hetero atoms are not bound to the same saturated, i.e. tetrahedral, carbon atom.

$R_3$ or $R_3'$ in Y, as alkyl group, can have straight or branched chains and contain one to 18, preferable one to eight carbon atoms. Examples thereof are the methyl, ethyl, isopropyl, pentyl, octyl, dodecyl and octadecyl group.

As substituted alkyl groups, $R_3$ or $R_3'$ represent, e.g. a hydroxyalkyl, alkoxyalkyl, aminoalkyl, alkylaminoalkyl or a dialkylaminoalkyl group having, in all, two to 10, preferably two to five, carbon atoms. Examples thereof are the β-hydroxyethyl, β-methoxyethyl, β-aminoethyl, β,β'-diethylaminoethyl or the β-butylaminoethyl group.

$R_3$ or $R_3'$ can also represent aryl groups, preferably phenyl groups.

In general, compounds in which y in Formula II is zero have an essentially better stabilizing action than those compounds in which y is 1.

Z in Formula I represents, e.g. the radical of a lower alkane having at least two carbon atoms, which alkane is optionally substituted by carboxyl groups, the radical of a benzene nucleus optionally substituted by chlorine or bromine, lower alkyl, lower alkoxy, lower alkoxycarbonylamino, hydroxyl, carboxyl, or acylamino groups, or a benzene radical substituted by optionally further substituted phenylethyl, styrene, phenyl, phenoxy, phenylthio, phenylsulphonyl groups, the $-SO_3^-M^+$ group or groups being bound direct to this benzene nucleus or to a monocyclic aryl radical of one of its substitutents, or Z represents a naphthalene or tetraline radical.

Z, as radical of a lower alkane can have a straight or branched chain and contain two to five, preferably two carbon atoms. Therefore, it is, e.g. the ethylene, propylene, trimethylene or pentamethylene radical. This radical can optionally also be substituted by carboxyl groups. An example of such is the carboxyethylene radical.

As benzene radical, Z in Formula I can be further substituted. It can contain, e.g. lower straight- or branched-chain alkyl radicals, e.g. it can be substituted by the methyl, ethyl or isopropyl group; the methyl group is preferred. Lower alkoxy groups as substituents of a benzene radical Z are, e.g. the methoxy, ethoxy or butoxy group. If Z as benzene radical is substituted by an acylamino group then the acyl radical thereof is derived, in particular, from a lower aliphatic or a monocarbocyclic aromatic carboxylic acid. Examples are the radical of acetic acid, propionic acid, β-methoxypropionic acid, benzoic acid, aminobenzoic acid or methylbenzoic acid. Examples of lower alkoxycarbonylamino groups as substituents of a benzene radical Z are the methoxy, ethoxy or butoxy carbonylamino radical.

If the group Z contains phenylethyl, styryl, phenyl, phenoxy, phenylthio or phenylsulfonyl groups as substituents, these can optionally be substituted by chlorine or bromine, lower alkyl groups such as the methyl or amino group, lower alkoxy groups such as the methoxy group, acylamino groups such as the acetyl- or benzoyl-amino group or alkoxycarbonyl-amino groups such as the methoxy- or ethoxy- carbonylamino group.

Optionally, also several of the substituents of the benzene radical Z mentioned above or of its substituents containing aryl groups can be present simultaneously. These may be identical or different.

As naphthalene radical, the group Z can optionally also be substituted by lower alkyl or alkoxy groups such as the methyl or methoxy group.

In general, compounds of Formula I wherein the radical Z contains hydroxyl, amino, acylamino, alkoxycarbonylamino or styrene substituents become more discolored on exposure to light then compounds wherein Z has no substituents or substituents of a different type.

The sulfonic acid group in Formula I designated by W in some of the subsequent formulas is preferably in its free acid form but it can also be in the form of its alkali or alkaline earth metal salts, its ammonium salt or its salts derived from organic nitrogen bases. Compounds of Formula I are preferred in which the group W is in the form of its lithium, sodium, potassium or magnesium or in the form of its ammonium salt or the ammonium salt of an organic nitrogen base, which ammonium cations fall under the formula $$[NR'R''R'''R'''']^+ \quad (III)$$

wherein

R', R'', R''', R'''' independently of each other represent hydrogen, a lower alkyl or β-hydroxy-lower alkyl radical or a cyclohexyl radical whereby at least two of these radicals can together form a carbocyclic or heterocyclic ring system.

Examples of organic nitrogen bases which can form the corresponding ammonium salts falling under Formula I are, e.g. trimethylamine, triethylamine, triethanolamine, diethanolamine, ethanolamine, cyclohexylamine, dicyclohexylamine, hexamethyleneimine and morpholine.

Because of their easy accessibility and their favorable stabilizing effect on a wide range of substrates, those compounds of Formula I are preferred which fall under the formula

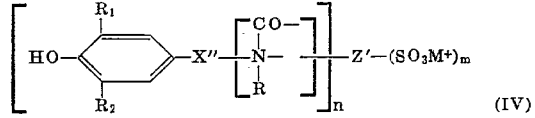

(IV)

wherein $R_1$ represents alkyl of from one to 12 carbon atoms, cyclohexyl, lower alkyl-cyclohexyl, benzyl or lower alkyl-benzyl, $R_2$ represents hydrogen or one of the groups represented by R, and $R_1$ and $R_2$ together have at least two carbon atoms, X'' represents a divalent bridge member selected from a single carbon-to-carbon bond, alkylene of from one to five carbon atoms, $CH_2$—S—$CH_2$ or NH the latter being linked to C in the adjacent bridge member

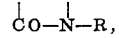

R represents hydrogen or alkyl of from one to 18 carbon atoms, each of $m$, and $n$ represents 1 or 2, Z' represents, depending on the value of $m$ and $n$, a divalent, trivalent or tetravalent radical selected from a. when each of $m$ and $n$ is 1, alkylene of from two to five carbon atoms,

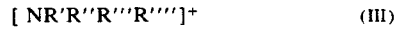

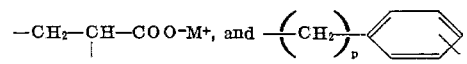

b. when $n$ is 1 and $m$ is 1 or 2, or when $m$ is 1 and $n$ is 2, a divalent or trivalent benzene radical or tetrahydronaphthalene radical, and c. when each of $m$ and $n$ represents 1 or 2, one of the divalent, trivalent or tetravalent radicals of naphthalene diphenyl, diphenyl ether, diphenyl thioether, diphenyl sulfone, stilbene or benzoylaminobenzene, $p$ is one of the integers 1 and 2, any substituent in an aromatic ring of Z other than an $SO_3^-M^{+B}$ group being selected from bromine, chlorine, lower alkyl, lower alkoxy, hydroxy, lower alkanoylamino and —$COO^-M^+$; and $M^+$ represents one equivalent of a cation selected from hydrogen ion, alkali metal ion, alkaline earth metal ion, ammonium ion, and hydrocarbyl-substituted, hydroxy-hydrocarbyl-substituted and oxa-hydrocarbyl-substituted ammonium ion.

More particularly preferred because of especially good stabilizing properties are those compounds of Formula IV, in which $R_1$ represents branched alkyl of from three to 12 carbon atoms, and especially tertiary alkyl of from four to 12 carbon atoms and wherein the grouping

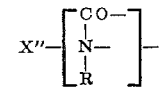

represents preferably the bridge member

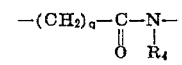

wherein $R_4$ represents hydrogen or lower alkyl and $q$ represents 0, 1 or 2; and this grouping most preferably represents the group —$CH_2$—$CH_2$—CO—NH—.

Most economic to produce are those compounds according to the invention and especially those falling under Formula IV in which each of $m$ and $n$ is 1 and Z or Z' represents ethylene, phenylene, toluylene, chlorophenylene, naphthylene or phenylene—$CH_2$—$CH_2$—phenylene, or a divalent radical of diphenyl ether, or of methyl- or chloro-diphenyl ether, and also those compounds in which Z is a trivalent radical of benzene or naphthalene. Compounds wherein Z is a benzene or diphenyl ether radical have particularly good fastness to light, while compounds in which Z is a naphthalene or phenylene—($CH_2$—$CH_2$)—phenylene radical have excellent wash fastness properties.

The benzene nuclei of Z in these preferred, economically produceable compounds are preferably free from further substituents apart from $SO_3^-M^+$ groups unless expressly stated otherwise above.

Most preferred because of outstanding stabilizing properties are the compounds of the formula

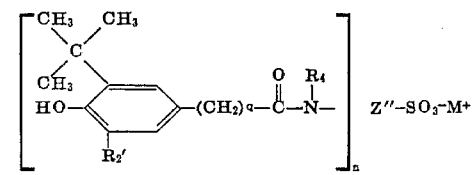

(V)

wherein $R_2'$ represents hydrogen, methyl or tert-butyl, $R_4$ represents hydrogen or lower alkyl, $q$ represents an integer ranging from 0 to 2, Z'' represents the ethylene radical, a di- or tri- valent radical of benzene or naphthalene or a divalent radical of diphenyl ether, and in most readily accessible compounds ethylene, phenylene or naphthylene, and M+ and n have the aforesaid meanings.

Of the compounds of Formula V, those in which $R_2'$ represents methyl and, particularly, those in which $R_2'$ represents tert-butyl are distinguished also by excellent fastness to alkali.

The water-soluble antioxidants of Formula I according to the invention can be produced by known methods by reaction of reactive derivatives of corresponding acids with corresponding amino compounds to form acid amides. For example, n mol of a compound of formula $$A — (X)_x — P \qquad (VI)$$

are reacted with one mol of a compound of formula $$[ W— ]_m — Z — [—(X')_{x'} —Q]_n \qquad (VII)$$

in which formulas, one of

P and Q represents the group $—NH—R_3$, the other represents the group

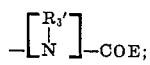

when y = 1, E is the group —OAr, when y = O, it is a chlorine or bromine atom or a reactive amino group, Ar being an aromatic radical of the benzene or naphthalene series, A, Z, W, m, n, $R_3$, $R_3'$, X, D', x, x' have the meanings given hereinbefore, while spitting off HE.

Examples of starting products of formula $$A — (X)_x — NH — R_3 \qquad (VIII)$$

wherein

A, X, x and $R_3$ have the meanings given above, which are embraced by formula VI and are suitable for the production of water soluble antioxidants according to the invention are:

4-hydroxy-3,5-di-tert.butyl aniline,
4-hydroxy-3,5-di-tert.butyl-benzylamine,
γ-(4-hydroxy-3,5-di-tert.butyl-phenyl)-propylamine,
4-hydroxy-3-tert.butyl-5-methyl aniline,
4-hydroxy-3,5-dicyclohexyl aniline,
4-hydroxy-3,5-di-tert.amyl aniline,
4-hydroxy-3,5-dicyclohexyl-benzylamine,
4-hydroxy-3-methylcyclohexyl-5-methyl aniline,
2-hydroxy-3-α,α-dimethylbenzyl-5-methyl-benzylamine,
4-hydroxy-3,5-dibenzyl aniline,
γ-(4-hydroxy-3,5-dibenzyl-phenyl)-propylamine,
2-hydroxy-3-tert.butyl-5-dodecyl aniline,
4-hydroxy-3-tert.octyl-5-methyl-benzylamine,
4-hydroxy-3,5-di-isopropyl-benzylamine,
4-hydroxy-3-tert.butyl-6-methyl-benzylamine,
4-hydroxy-3,5-di-tert.amyl-benzylamine,
2-hydroxy-3,5-dimethyl aniline and
2-hydroxy-3-tert.butyl-5-methyl-benzylamine.

Examples of starting products embraced by formula VI which are of the formula

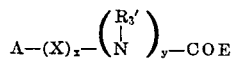

wherein

A, X, x, $R_3$, y and E have the meanings given above, are:
β-(4-hydroxy-3,5-di-tert.butyl-phenyl)-propionic acid chloride,
4-hydroxy-3,5-di-tert.butyl-phenyl-acetyl chloride,
4-hydroxy-3,5-di-tert.butyl-benzoyl chloride,
4-hydroxy-3-tert.butyl-5-methyl-phenyl-acetyl chloride,
2-hydroxy-3,5-dimethyl-benzoyl chloride,
2-hydroxy-3-tert.butyl-5-methyl-benzoyl chloride,
S-(4-hydroxy-3-tert.butyl-5-methyl-benzyl)-thioglycolic acid chloride,
4-hydroxy-5-tert.butyl-phenyl-acetyl chloride,
β-(4-hydroxy-3,5-dicyclohexyl-phenyl)-propionic acid bromide,
(4-hydroxy-3,5-dicyclohexyl-phenyl)-acetyl chloride,
4-hydroxy-3,5-di-dodecyl-benzoyl chloride,
β-(4-hydroxy-3-benzyl-5-methyl-phenyl)-propionic acid chloride,(4-hydroxy-3-benzyl-5-methyl-phenyl)-acetyl chloride,
4-hydroxy-3,5-di-isopropyl-phenyl-acetyl chloride,
S-(4-hydroxy-3,5-di-isopropyl-benzyl)-thioglycolic acid chloride,
β-[ω-(4-hydroxy-3,5-di-tert.butyl-phenyl)-propyloxy]-propionic acid chloride,
[ω-(4-hydroxy-3,5-di-tert.butyl-phenyl)-propyloxy]-acetyl chloride,
β-methyl-β-(4-hydroxy-3,5-di-tert.butyl-phenyl)-propionic acid chloride,
4-hydroxy-3,5-di-tert.amyl-benzyloxy-acetyl chloride and
4-hydroxy-5-tert.butyl-3-ethyl-benzyloxy-acetyl chloride.

Examples of starting products embraced by formula VII which are of the formula $$[W—]—_m Z—[—(X')_{x'}—NH—R_3]_n \qquad (X)$$

wherein

W, m, Z, X', x', $R_3$ and n have the meanings given above, are:
2-amino-benzene sulphonic acid,
3-amino-benzene sulphonic acid,
4-amino-benzene sulphonic acid,
5-chloro-2-amino-benzene sulphonic acid,
5-methyl-4-chloro-2-amino-benzene sulphonic acid,
2-chloro-5-amino-benzene sulphonic acid,
4-chloro-3-amino-benzene sulphonic acid,
5-chloro-4-methyl-3-amino-benzene sulphonic acid,
2,5-dichloro-4-amino-benzene sulphonic acid,
3-bromo-6-amino-benzene sulphonic acid,
3,4-dichloro-6-amino-benzene sulphonic acid,
1-amino-tetraline-4-sulphonic acid,
1-aminobenzene-2,5-disulphonic acid,
1-amino-benzene-2,4-disulphonic acid,
1,3-diamino-benzene-4-sulphonic acid,
2-amino-5-methyl-benzene sulphonic acid,
5-amino-2,4-dimethyl-benzene sulphonic acid,
4-amino-2-methyl-benzene sulphonic acid,
3-amino-5-isopropyl-2-methyl-benzene sulphonic acid,
2-amino-4,5-dimethyl-benzene sulphonic acid,
2-amino-4,5-dimethoxy-benzene sulphonic acid,
5-amino-2-methyl-benzene sulphonic acid,
2-amino-5-ethyl-benzene sulphonic acid,
1-amino-naphthalene-3-sulphonic acid,
1-amino-naphthalene-4-sulphonic acid,
1-amino-naphthalene-5-sulphonic acid,
1-amino-naphthalene-6-sulphonic acid,
1-amino-naphthalene-7-sulphonic acid,
1-amino-naphthalene-8-sulphonic acid,
2-amino-naphthalene-1-sulphonic acid,
2-amino-naphthalene-5-sulphonic acid,
2-amino-naphthalene-6-sulphonic acid,
1-amino-naphthalene-3,6-disulphonic acid,
1-amino-naphthalene-3,8-disulphonic acid,
2-amino-naphthalene-4,8-disulphonic acid,
2-amino-naphthalene-5,7-disulphonic acid,
2-amino-naphthalene-6,8-disulphonic acid,
1,4-diamino-naphthalene-6-sulphonic acid,
3-amino-4-methoxy-benzene sulphonic acid,
1-amino-2-methoxy-naphthalene-6-sulphonic acid,
3-amino-4-hydroxy-benzene sulphonic acid,
3-amino-6-hydroxy-benzene-1,5-disulphonic acid
2-amino-5-hydroxy-naphthalene-7-sulphonic acid,
2-acetamido-5-amino-benzene sulphonic acid,
2-amino-5-(p-amino-benzoylamino)-benzene sulphonic acid,
2-amino-5-benzamido-benzene sulphonic acid,
4,4'-diamino-thiodiphenyl ether-2,2'-disulphonic acid,
2-amino-4-carboxy-5-chlorobenzene sulphonic acid,
4-amino-3-carboxy-benzene sulphonic acid,
5-amino-3-sulpho-salicylic acid,
2-(β-phenylethyl)-5-amino-benzene sulphonic acid,
1,2-bis-[4-amino-2-sulphophenyl]-ethane, 4,4'-diamino-stilbene-2,2'-disulphonic acid,
4-amino-stilbene-2-sulphonic acid,
4,4'-diamino-2'-methoxy-stilbene-2-sulphonic acid,
4-amino-diphenyl ether-3-sulphonic acid,
2-amino-diphenyl ether-4-sulphonic acid,
2-amino-2'-methyl-diphenyl ether-4-sulphonic acid,
2-amino-4-chloro-4'-amyl-diphenyl ether-5-sulphonic acid,
2-amino-4,4'-dichloro-diphenyl ether-2'-sulphonic acid,
2,5-diamino-2'-methyl-diphenyl ether-4-sulphonic acid,
benzidine-2,2'-disulphonic acid,
3,3'-dimethyl-benzidine-6-sulphonic acid,
benzidine-2-sulphonic acid,
2'-amino-diphenyl sulphone-3-sulphonic acid,
5'-amino-2'-methyl-diphenyl sulphone-3-sulphonic acid,
2',5'-diamino-4-methyldiphenyl sulphone-3-sulphonic acid,
3'-amino-4'-hydroxy-diphenyl sulphone-3-sulphonic acid,
3,3'-diamino-diphenyl sulphone-4,4'-disulphonic acid,
N-ethyl-aniline-4-sulphonic acid,
N-methyl-2-naphthylamine-7-sulphonic acid,
2-aminoethane sulphonic acid,
N-methyl-, N-ethyl-, N-propyl-, N-isopropyl-, N-amyl-, N-hexyl-,
N-cyclohexyl-, N-octyl-, N-phenyl-, N-dodecyl- or N-stearyl-2-amino- ethane sulphonic acid,
2-methyl-2-amino-ethane sulphonic acid,
ω-amino-propane sulphonic acid,
ω-amino-butane sulphonic acid,
ω-amino-pentane sulphonic acid,
N-methyl-γ-amino-propane sulphonic acid,
1,2-diamino-ethane sulphonic acid,
2-methylamino-propane sulphonic acid and
2-amino-2-carboxy-ethane sulphonic acid.

Examples of starting products embraced by formula VII which are of the formula

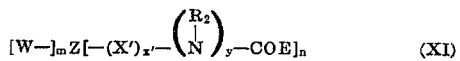

(XI)

wherein

W, $m$, Z, X', $x'$, $R_2$, $y$, V and $n$ have the meanings given above, are:

2-sulpho-benzoyl chloride,
3-sulpho-benzoyl chloride,
4-sulpho-benzoyl chloride,
3,5-disulpho-benzoyl chloride,
3-sulpho-phthaloyl chloride,
3,4-disulpho-phthaloyl chloride,
4-sulpho-phenyl acetyl chloride,
β-(4-sulpho-phenyl)-propionic acid chloride,
3-sulpho-6-methyl-benzoyl chloride.

Some of the starting products mentioned above are new and can be produced by known methods.

To produce compounds according to the invention of formula I, compounds of formula VIII are reacted with compounds of formula XI or compounds of the Formula IX are reacted with compounds of Formula X, preferably in about molar ratios.

Reactions of VIII + XI or of IX + X, $y$ in XI and IX being O, and E being chlorine or bromine, are advantageously performed at room temperature or slightly raised temperature. For example, the components of formulas VIII or X are dissolved in water or dimethyl acetamide and the components of Formulas XI or IX are added as such or dissolved in organic solvents such as dimethyl acetamide, acetone or chlorobenzene.

Reactions of VIII + XI or of X + IX, $y$ in IX and XI being O, and E being a reactive amino group, e.g. the Cl⁻H₃N⁺— group or the radical of a heterocycle containing nitrogen such as the 1-imidazolide radical, are advantageously performed at a raised temperature, e.g. in the melt or in boiling organic solvents such as diethyl ether, tetrahydrofuran or dimethyl formamide.

Reactions of VII+ XI or of IX + X, $y$ in IX and XI being 1, and E being the group —OAr, are advantageously performed at a slightly raised temperature in organic or aqueous-organic solvents.

Compounds according to the invention or Formula I can also be obtained by using, in the reactions described above, compounds of Formulas X or XI in which the group W is replaced by a sulfofluoride or a sulfoalkyl or sulfoaryl ester group such as the sulfomethyl, sulfoethyl, sulfopropyl, sulfoisopropyl, sulfobutyl or sulfophenyl ester group and, on completion of the reaction, liberating the group W hydrolytically from its halides or esters.

Examples of such compounds of Formulas X and XI in which W is replaced by derivatives of the sulfonic acid group are aniline-3-sulfophenyl ester, aniline-3-sulfofluoride, aniline-4-sulphomethyl ester or aniline-4-sulphobutyl ester.

In addition, compounds according to the invention of formula I can be obtained by using in the reactions described above compounds of formulas X or XI wherein the group W is replaced by hydrogen and, on completion of the reaction, introducing the group W by subsequently sulphonating the reaction product. Examples of such compounds of formulas X or XI wherein the group W is replaced by hydrogen are aniline, 1-naphthylamine, 2naphthylamine, 4-amino-diphenyl ether, 2-amino-4-phenyl butane or benzylamine.

According to the invention, those polymers and articles made therefrom are stabilized against the effect of heat and/or oxygen which contain amide, urea, urethane or hydrazide groupings or radicals of slightly basic heterocycles containing nitrogen, e.g. s-triazinyl, pyrimidyl, pyridyl, imidazolyl or pyridazinyl radicals. The stabilization with the compounds according to the invention is particularly favorable when, in addition to the slightly basic groups mentioned above, there is also a slight percentage of strongly basic groups such as amino groups present.

Polymers which contain the groups mentioned above are, e.g.:

1. Polyamides, i.e. linear, thermoplastic condensation polymers which are derived from either dicarboxylic acids and organic diamines or from aminocarboxylic acids. Preferred linear polycondensates are the polymers forming fibers from ω,ω'-dicarboxylic acids and ω,ω'-diamines as well as from ω-aminocarboxylic acids, particularly those polymers which are derived from saturated aliphatic carboxylic acids. The linear condensation products of the components adipic acid-hexamethylene diamine, sebacic acid-hexamethylenediamine, ω-aminocaproic acid and 11-aminoundecylic acid, or the mixed polyamide from adipic acid-hexamethylendiamine salt (AH sal) and ω-amino-caproic acid, are especially suitable.

2. Homopolymers and copolymers of lactams, in particular the polymers of ε-caprolactam or lauryl lactam.

3. Polyurethanes such as addition polymers of isocyanates with hydroxyl compounds, particularly those of di- or poly-isocyanates with di- or poly- valent hydroxyl compounds, or condensation polymers of bis-chloroformic acid esters with diamines. Examples are the linear reaction products of the components hexamethylene di-isocyanate and butane diol.

4. Polyether and polyester urethanes, formed from prepolymers produced from polyesters containing hydroxyl end groups and/or polyethers on the one hand and di-isocyanates on the other, as well as suitable chain lengthening and cross-linking compounds. Examples are elastomers, the prepolymers of which are produced from adipic acid-ethylene glycol polyesters and/or polypropylene or polytetramethylene ether glycols on the one hand and diisocyanates such as toluylene, naphthalene-1,5-di-isocyanate or diphenylmethane-4,4'-di-isocyanate on the other and which are subsequently reacted with water, diols, triols, diamines, aminoalcohols or hydrazine. The compounds according to the invention are particularly well suited for the stabilizing of elastomers the prepolymers of which are produced from polyethers and diisocyanates.

5. Polyureas such as addition polymers of isocyanates with amino compounds, particularly those of di- or poly- isocyanates with di- or poly- valent amino compounds, or condensation polymers of urea with diamines. An example thereof is polynonamethylene urea.
6. Copolymers of acrylonitrile with basic vinyl compounds such as vinyl pyridine, vinyl lactams, vinyl imidazoles or acrylamide.
7. Polyblends, produced from polyolefins, particularly isotactic polypropylene, and basic polymers or copolymers obtained from the vinyl monomers mentioned under 6 by homo- or copolymerization, e.g. with styrene or acrylates.

Advantageously the new antioxidants according to the invention are brought onto the polymers containing basic groups from an aqueous medium or one containing water. Technically, this has the great advantage that there is no need to add the stabilizers during or immediately after the production of the polymers. Hitherto, this has been necessary and would sometimes lead to disturbances of the polycondensation. In contrast thereto, the new water-soluble antioxidants make it possible to stabilize the polymeric material, whether it be fibers, threads, articles, fabrics, foam rubbers, lacquers, bristles, films, suitably formed injection moulded articles, etc., against damage due to the effect of heat and/or oxygen, by a simple after-treatment in conformity with the later intended use or the specific properties required of such polymeric materials.

Another advantage of the antioxidants according to the invention has been found to be that, because they are subsequently brought onto the polymeric material, they are often preferably bound to the surface thereof, i.e. their action can be developed on that part of the polymer which is most strongly exposed to the injurious influence of air/oxygen. This effect is very favorable particularly in the treatment of polymeric articles having a great surface area such as fibers or fabrics or articles made up therefrom. Although the new antioxidants dissolve very easily in water, after they have been brought onto the polymeric material they adhere to it very strongly and, in aqueous washing liquors they have surprisingly good fastness to washing. With regard to fastness to washing, those compounds according to the invention of formula I having a bicyclic or divalent radical Z are particularly favorable.

All other previously known additives for the stabilizing of polymers containing basic groups to the effect of heat and/or oxygen however, with the exception of certain copper salts, can only be added to the melt or to the organic solution of the polymer, its prepolymers or its monomeric starting material.

However, the antioxidants according to the invention can also be added to the polymer or to the corresponding monomers during the production thereof. In other words, the addition of the new antioxidants is not limited to an aftertreatment from aqueous medium. For example, the antioxidants according to the invention can be added to the solution of the copolymers in solvents such as dimethyl formamide, nitromethane or dimethyl sulphoxide or even to the aqueous solutions of the monomers, in the stabilization of acrylonitrile-vinyl pyridine copolymers. Further, in the stabilization of polyurethanes, they can be incorporated into the corresponding polyols or prepolymers or also, as in the stabilization of polyamides, they can be incorporated into the solution of the finished polymer, e.g. before spinning or working up. The same is true of polyamides, into which the new antioxidants can be incorporated before or after polymerization. For example, if the antioxidants according to the invention are added to the melt of a polyamide, they have the advantage of substantially slighter volatility than the previously known phenolic antioxidants which are to be used in this way.

In general, the usual auxiliaries and additives which are added to the polymers during or after polymerization such as catalysts, plasticisers, fillers, organic or inorganic pigments, UV absorbers, antistatics, optical brighteners, dyestuffs etc., are not affected by the antioxidants according to the invention provided the cation thereof is suitably chosen.

To stabilize the polymers containing basic groups, 0.03 – 3 percent, preferably 0.1 – 1 percent, of the compounds according to the invention, calculated on the weight of the polymer, are added independently of whether they are added in the polymerization or to the melt of the finished polymer or are subsequently applied from aqueous medium. In general, the antioxidants according to the invention, optionally with the addition of salts such as sodium sulphate, sodium chloride, ammonium acetate, ammonium formate or of wetting or levelling agents, antistatics, acids, carriers. are brought onto the polymeric material from an aqueous bath at a pH of 2 – 6, preferably 3 – 4, and a liquor ratio of 1:15 to 1:50, preferably 1:25 to 1:35. The treatment is given for 15 – 60, preferably 20–35, minutes and, advantageously at a raised temperature, preferably at 70° – 120° C. At temperatures over 100° C, treatment is given under pressure.

The following examples illustrate the invention. The temperatures are given in degrees Centigrade.

Example 1

22.3 g of 1-naphthylamine-4-sulphonic acid are slurried in 500 g of N,N-dimethyl acetamide and, after the addition of 20 g of triethylamine, dissolved while stirring at 60°. The solution is cooled to 10° and, while continuously stirring, a solution of 31 g of 4-hydroxy-3,5-di-tert.butylphenyl acetyl chloride, produced from 3,5-di-tert.butyl-4-hydroxyphenyl acetic acid and thionyl chloride, in 50 g of o-dichlorobenzene is added dropwise within 30 minutes and then 10 g of triethylamine are added. The whole is stirred for 12 hours, precipitated triethyl ammonium chloride is filtered off under suction and the filtrate is completely evaporated in vacuo at 90°–95°. The brownish syrup which remains is dissolved in 30 g of water and about 1,000 g of concentrated hydrochloric acid are added. A partly crystalline precipitate is formed which is filtered off under suction after 2 hours and then dried in vacuo at 100°. The product is boiled up in a 2:1 mixture of acetic acid and water, undissolved parts are removed by filtration and the filtrate is concentrated in vacuo. The residue is recrystallized twice from a 5:2 mixture of acetic acid and 1N hydrochloric acid, a small insoluble part being filtered off hot each time.

In this way, 5.8 g of 1-N-(4-hydroxy-3,5-di-tert.butyl-phenylacetyl)-naphthylamine-4-sulphonic acid are obtained in the form of white needles which are dried in vacuo at 100°. They are then left to stand in the open for 48 hours whereupon they contain 1 mol of crystal water. The compound melts at above 210°–220° with foaming.

Example 2

20 g of 3-aminobenzene sulphonic acid are finely pulverized and suspended in 250 g of N,N-dimethyl acetamide. After adding 10 g of triethylamine, the mixture is heated to 95° until complete solution is attained. The solution is cooled to 5° and, while stirring, a solution of 32.9 g of S-(4-hydroxy-3,5-di-tert.butylbenzyl)-thioglycolic acid chloride in 60 g of chlorobenzene and then 10 g of triethylamine are added dropwise within 90 minutes, the temperature of the reaction mixture being kept at 5°–10°. After stirring for 12 hours, the precipitated precipitate is filtered off and the filtrate is evaporated at 90°–100° in vacuo. A yellowish syrup remains which is dissolved in 300 ml of acetic acid. After standing for 12 hours, the precipitated precipitate is filtered off. After standing for several days, the N-(4-hydroxy-3,5-di-tert.butyl-benzylmercapto-acetyl)-aniline-3-sulphonic acid crystallizes from the filtrate in the form of its triethyl ammonium salt. It is filtered off under suction, the salt is dissolved in methanol and it is again precipitated by the addition of ethyl ether. In this way, 11 g of the pure, white, crystalline compound are obtained, M.P.196°.

Example 3

23.5 g of aniline-3-sulphonic acid phenyl ester and 11 g of triethylamine are dissolved in 200 g of chlorobenzene. 27 g of 4-hydroxy-3,5-di-tert.butyl-benzoyl chloride are added dropwise at room temperature and the whole is stirred for 12 hours. The yellowish suspension formed is evaporated in vacuo, and the residue is slurried in a mixture of methanol/water, filtered off under suction and washed with water. In this way, 46.4 g of N-(4-hydroxy-3,5-di-tert.butyl-benzoyl)-aniline3-sulphonic acid phenyl ester are obtained. After recrystallization from isopropanol it melts at 210°.

18 g of the phenyl ester so obtained are suspended in 150 g of methanol. A solution of 3 g of sodium hydroxide in 50 g of methanol is added dropwise at room temperature while stirring and the clear solution obtained is refluxed for 20 hours. The solution is evaporated in vacuo and the residue is kneaded with 200 g of concentrated hydrochloric acid. The white, semi-solid residue is filtered off under suction and dried in vacuo at 100°. It is recrystallized from 400 g of a 1:1 mixture of acetic acid and concentrated hydrochloric acid, cooled and, after standing for 3 hours, the precipitated precipitate is filtered off. The filtrate is evaporated in vacuo and the residue is boiled up in 100 ml of acetic acid. After cooling, the crystalline precipitate is filtered off under suction and dried for 12 hours at 120° in vacuo. In this way, 3g of N-(4-hydroxy-3,5-di-tert.butylbenzoyl)-aniline-3-sulphonic acid are obtained. It melts at over 250° with foaming.

Example 4

22.3 g of 1-naphthylamine-4-sulphonic acid are added to 700 g of N,N-dimethyl acetamide. After adding 20 g of triethylamine, the mixture is heated to 50° whereupon complete solution is attained. It is cooled to 15°–20° and, at this temperature, a solution of 19 g of 2-hydroxy-3,5-dimethyl-benzoyl chloride in 50 g of chlorobenzene is added dropwise within 1 hour while stirring. 10 g of triethylamine are then added and the reaction mixture is stirred for 6 hours. It is evaporated in vacuo, the solid, yellow colored residue is dissolved in 200 g of hot acetic acid, 50 g of concentrated hydrochloric acid are added and the whole is allowed to cool. The product which crystallizes out is filtered off under suction, dried and recrystallized three time from a 3:1 mixture of acetic acid and concentrated hydrochloric acid.

In this way, 19.5 g of 1-N-(2-hydroxy-3,5-dimethyl-benzoyl)-naphthylamine-4-sulphonic acid are obtained in the form of yellow crystals. After standing for 24 hours in the air, they contain 1.9 mols of crystal water and have an unclear melting point of over 200°.

Example 5

11 g of 1-naphthylamine-8-sulphonic acid are slurried in 30 g of N,N-dimethylacetamide and, after the addition of 5 g of triethylamine, dissolved at 40°. The solution is then cooled to 0°–10 and, at this temperature, a solution of 60 g of β-(4-hydroxy-3,5-di-tert.butylphenyl)-propionic acid chloride in 30 g of N,N-dimethylacetamide is added dropwise within 15 minutes while stirring. After the dropwise addition, the whole is stirred for 30 minutes at 0°–10° and another 5 g of triethylamine are added dropwise. The whole is stirred for 24 hours and the temperature is allowed to rise to room temperature. The precipitated precipitate is filtered off and washed with 20 g of cold N,N-dimethyl acetamide. The product is boiled up in 100 g of glacial acetic acid and concentrated hydrochloric acid is added to the hot solution until it becomes opaque. The precipitate which precipitates after cooling is filtered off, washed with 30 g of a mixture of glacial acetic acid and concentrated hydrochloric acid, again recrystallized from 100 g of a mixture of glacial acetic acid/water and dried for 12 hours in vacuo at 70°.

7.4 g of 1-N-(β-4-hydroxy-3,5-di-tert.butylphenylpropionyl)-naphthylamine-8-sulphonic acid are obtained in the form of white crystals which, after standing for 24 hours in the air, contain 1 mol of crystal water. The compound melts at above 200° with foaming.

Example 6

35 g of aniline-3-sulphonic acid are slurried in 400 g of N,N-dimethyl acetamide and, after addition of 22 g of triethylamine, dissolved at 80°. The solution is then cooled to 0° – 10° and, at this temperature, a solution of 60 g of β-(4-hydroxy-3,5-di-tert.butylphenyl)-propionic acid chloride in 70 g of chlorobenzene is added dropwise within 20 minutes while stirring. After the dropwise addition, the whole is stirred for 30 minutes at 0°–10° and another 22 g of triethylamine are added dropwise. The whole is stirred for 12 hours, the temperature is allowed to rise to room temperature, it is filtered and the filtrate is concentrated in vacuo at 90°–95°. The resin which remains is dissolved in 300 g of glacial acetic acid and gaseous hydrogen chloride is introduced into the solution at 0°–10 until saturation is reached. 300 g of a 1:1 mixture of glacial acetic acid and concentrated hydrochloric acid are then added. The precipitated precipitate is filtered off and washed with 50 g of a 1:1 mixture of acetic acid/water. The product is boiled up in 300 g of glacial acetic acid and concentrated hydrochloric acid is carefully added to this hot solution until it becomes opaque. The precipitate which precipitates after cooling is filtered off, washed with 100 g of a 1:1 mixture of glacial acetic acid and water and dried in vacuo for 12 hours at 70°.

In this way, 23 g of N-(β-4-hydroxy-3,5-di-tert.butylphenylpropionyl)-aniline-3-sulphonic acid are obtained in the form of white crystals which, after standing for 24 hours in the air, contain 1.75 mols of crystal water. The compound melts at above 200° with foaming.

The same compound is also obtained in the following way: 17.5 g of aniline-3-sulphonic acid are slurried in 100 g of distilled water and dissolved with 10 ml of concentrated sodium hydroxide solution. The solution is cooled to 0°–5° and a solution of 7.5 g of β-(4-hydroxy-3,5-di-tert.butylphenyl)-propionic acid chloride in 25 g of acetone is added dropwise within 20 minutes. The whole is stirred for 12 hours at 0°–10°, 100 g of gaseous hydrogen chloride are then introduced, it is stirred for 2 hours and the precipitated N-(β-4-hydroxy-3,5-di-tert.butylphenylpropionyl)-aniline-3-sulphonic acid is filtered off under suction and purified as described above.

Example 7

35g of aniline-2-sulphonic acid are slurried in 400 g of N,N-dimethyl acetamide and dissolved after the addition of 22 g of triethylamine at 70°. The solution is then cooled to 0°–10° and, at this temperature, 60 g of β-(3,5-di-tert.butyl-4-hydroxyphenyl)-propionic acid chloride, produced from 4-hydroxy-3,5-di-tert.butylphenyl propionic acid and thionyl chloride, dissolved in 70 g of chlorobenzene are added dropwise within 15 minutes while stirring. After the dropwise addition, the whole is stirred for 30 minutes at 0°–10° and then another 22 g of triethylamine are added dropwise. The whole is stirred for 12 hours, the temperature is allowed to rise to room temperature, it is filtered and the filtrate is concentrated in vacuo at 90°–95. The dark brown resin which remains is dissolved in 100 g of acetic acid and gaseous hydrogen chloride is introduced into this solution at 0°–10° until saturation is reached. The precipitated precipitate is filtered off and washed with 50 g of acetic acid. The product is boiled up in 500 g of acetic acid and the insoluble white precipitate is filtered off. The precipitate which precipitates after cooling is filtered off, washed with 30 g of acetic acid, again recrystallized from 500 g of acetic acid and dried for 12 hours in vacuo at 70°.

20.5 g of N-(β-4-hydroxy-3,5-di-tert.butylphenylpropionyl)-aniline-2-sulphonic acid are obtained in the form of white crystals which, after standing for 12 hours, contain 1 mol of crystal water. The compound melts at above 180° with foaming.

4.3 g of N-(β-4-hydroxy-3,5-di-tert.butylphenylpropionyl)-aniline-2-sulphonic acid are slurried at 50° in 30 g of toluene and, at the same temperature, 1 g of cyclohexylamine is added dropwise while stirring vigorously. The whole is stirred for 30 minutes at 50° and then 10 g of hexane are added. It is cooled and the crystalline precipitate is filtered off. The product is boiled up in a mixture of 30 g of isopropanol and 5 g of distilled water, filtered and cooled. It is filtered and the compound is dried at 70° in vacuo. In this way 2.4 g of the cyclohexyl ammonium salt of N-(β-4-hydroxy-3,5-di-tert.butylphenylpropionyl)-aniline-2-sulphonic acid are obtained in the form of white crystals which melt at 210°.

Example 8

14 g of 2-aminodiphenyl ether-4-sulphonic acid are slurried in 50 g of N,N-dimethyl acetamide and, after the addition of 5 g of triethylamine, dissolved at 40°. The solution is then cooled to 0°–10° and, at this temperature, the β-(3,5-di-tert.butyl-4-hydroxyphenyl)-propionic acid chloride dissolved in 20 g of N,N-dimethyl acetamide is added dropwise within 30 minutes while stirring. The whole is stirred for 24 hours and the temperature is allowed to rise to room temperature. It is filtered and the filtrate is evaporated in vacuo at 90°–95°. The dark brown resin which remains is taken up in 100 g of toluene and boiled up. The precipitate which precipitates hot is filtered off and washed with 50 g of toluene. The product is boiled up in 150 g of acetic acid, the undissolved white precipitate is filtered off and concentrated hydrochloric acid is carefully added to the hot solution until it becomes opaque. The precipitate which precipitates after cooling is filtered off, washed with 30 g of a 1:1 mixture of acetic acid and water, again recrystallized from 200 g of acetic acid and dried for 12 hours in vacuo at 70°.

12.5 g of 2-N-[β-(4-hydroxy-3,5-di-tert-butylphenyl)-propionyl]-amino-diphenyl ether-4-sulphonic acid are obtained in the form of white crystals which, after standing for 24 hours, contain traces of crystal water. The compound melts at above 220° with foaming.

Example 9

5 g (0.025 mol) of metanilic acid containing crystal water are suspended in 200 ml of water and 10 percent sodium carbonate solution is added until the reaction is neutral. 3.9 g of chloroformic acid phenyl ester are added dropwise to the clear solution formed while stirring vigorously, the pH of the reaction mixture being kept between 6 and 7 by the simultaneous addition of sodium carbonate solution. As soon as the smell of the chloroformic acid ester has disappeared, the air in the reaction vessel is replaced by nitrogen and 5.5 g of 4-hydroxy-3,5-di-tert.butyl aniline dissolved in 60 ml of methanol are added. The mixture is vigorously stirred for 3 hours at 60° under an atmosphere of nitrogen and is then filtered with the addition of diatomaceous earth until clear. The methanol is evaporated in vacuo whereupon the product crystallizes out of the aqueous solution. The moist substance, N-(3-sulphophenyl)-N'-(3,5-di-tert.butyl-4-hydroxyphenyl)-urea, is recrystallized from chloroform. After drying in vacuum, on standing in the atmosphere it takes up about 2 mols of water.

Example 10

22.4 g of naphthalene-2-amino-5-sulphonic acid are suspended in 200 ml of water and 10 percent sodium carbonate solution is added until the reaction is neutral. 20 g of chloroformic acid phenyl ester are gradually added dropwise to the stirred clear solution obtained, the pH of the reaction mixture being kept between 6 and 7 by the simultaneous addition of sodium carbonate solution. On completion of the addition, the whole is stirred for another hour. The reaction mixture is cooled to 5° and the precipitated product is filtered off. The filter residue is washed with chloroform to remove non-reacted chloroformic acid phenyl ester and side products. 32 g of dry product remain. 7.3 g of this substance are suspended in about 200 ml of water and reacted with 4-hydroxy-3,5-di-tert.butyl aniline as described in the previous example. After removal of the methanol, on the addition of sodium hydroxide solution a solution is obtained from which a jelly-like precipitate is precipitated with concentrated hydrochloric acid. This precipitate which, after standing for 2 days, becomes crystalline is filtered off and washed with dilute sodium chloride solution. To purify, the moist filter residue is dissolved in warm ethanol and 8 g of dicyclohexylamine are added. On diluting this solution with water, the dicyclohexyl ammonium salt of N-(5-sulpho-2-naphthyl)-N'-(3,5-di-tert.butyl-4-hydroxyphenyl)-urea precipitates. It is filtered off, washed on the filter with isopropanol and then recrystallized from moist methanol. To liberate the sulphonic acid, the dicyclohexyl ammonium salt is dissolved in hot ethanol and acidified with dilute sulphuric acid. The free sulphonic acid precipitates on dilution with water.

Example 11 a. 15 g of 4-(β-phenylethyl)-aniline-3-sulphonic acid are dissolved in 200 g of chlorobenzene. A solution of 15 g of β-(4-hydroxy-3,5-di-tert.butylphenyl)-propionic acid chloride in 30 g of chlorobenzene is added dropwise within 10 minutes while stirring. 11 g of triethylamine are then added dropwise and the mixture is cooled to 0° – 10°. The whole is stirred for 12 hours at room temperature. The crystalline precipitate is filtered off, boiled up in 100 g of acetic acid and, while still hot, concentrated hydrochloric acid is added until it becomes opaque. It is cooled, the precipitate is filtered off, again boiled up in a mixture of 150 g of isopropanol/water 6:1, cooled and filtered off. The crystalline product is dried in vacuo at 70°.

In this way, 12 g of 2-β-phenylethyl-5-β-(4-hydroxy-3,5-di-tert.butylphenyl)-propionylaminobenzene sulphonic acid is obtained as white crystals. It is partly in the form of the triethyl ammonium salt. After standing in the air for 24 hours, the crystals do not take up crystal water. The compound melts at 100° with foaming.

b. By replacing the starting sulfonic acid derivative in the above example by an equivalent amount of 1,2-(4,4'-diamino-2-sulfo-diphenyl)-ethane and 30 g of the propionyl chloride, while otherwise following the above-given procedure, the compound of the formula

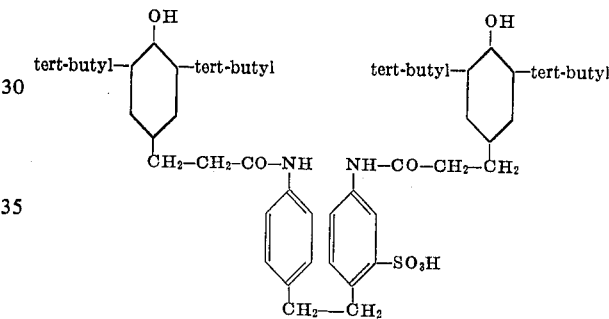

of similar properties as the final product obtained under (a) is produced.

Example 12

16.1 g of the sodium salt of 2-N-methylaminoethane sulphonic acid are dissolved in 100 g of distilled water. The solution is cooled to 0°–5° and while still stirring, a solution of 15 g of β-(4-hydroxy-3,5-di-tert.butylphenyl)-propionic acid chloride in 50 g of chlorobenzene is added dropwise within 20 minutes. The whole is stirred for 12 hours at 0°–10° and, while stirring strongly, 50 g of concentrated hydrochloric acid are added. The chlorobenzene is distilled off with steam, it is filtered and washed with 50 g of distilled water. The product is then dissolved in 250 ml of hot acetic acid, filtered off and cooled. The crystalline precipitate is filtered off, washed with 30 g of acetic acid and dried in vacuo at 70°.

8.7 g of 2-N-(4-hydroxy-3,5-di-tert.butylphenylpropionyl)-N-methyl— aminoethane sulphonic acid are obtained in the form of white crystals which, after standing in the air for 24 hours, take up no crystal water. The compound melts at 244° with foaming.

Example 13

14.7 g of the sodium salt of 2-aminoethane sulphonic acid are dissolved in 100 g of distilled water. The solution is cooled to 0°–5° and while still stirring, a solution of 15 g of β-(4-hydroxy-3,5-di-tert.butylphenyl)-propionic acid chloride in 50 g of chlorobenzene is added dropwise within 20 minutes. After stirring for 12 hours, 50 g of concentrated hydrochloric acid are added while stirring vigorously. The chlorobenzene is distilled off with steam, it is cooled, filtered off and washed with 30 g of hydrochloric acid. The crystalline product is dried in vacuo at 70°.

16.2 g of 2-N-(β-4-hydroxy-3,5-di-tert.butylphenylpropionyl)-aminoethane sulphonic acid are obtained in the form of white crystals which, after standing for 24 hours in the air, only contain traces of crystal water. The compound melts at above 240° with foaming.

Example 14 a. 17 g of 2-amino-4,4'-dichlorodiphenyl ether-2'-sulphonic acid are dissolved in 200 g of chlorobenzene. A solution of 15 g of β-(4-hydroxy-3,5-di-tert.butylphenyl)-propionic acid chloride in 30 g of chlorobenzene is added dropwise within 10 minutes while stirring. 11 g of triethylamine are then added dropwise and the mixture is cooled to 0°–10°. The whole is stirred for 12 hours at room temperature, filtered and dried in vacuo at 80°. The residue is boiled up in 150 g of ligroin and cooled. The crystalline precipitate is filtered off and boiled up in 150 g of toluene, cooled, filtered off and again boiled up in a mixture of 150 g of acetic acid/water 4:1, cooled and filtered off. The crystalline product is dried in vacuo at 70°. In this way, 10 g of 2-[β-(4-hydroxy-3,5-di-tert.butylphenyl)propionyl]-amino)-4,4'-dichlorodiphenyl ether-2'-sulphonic acid are obtained in the form of the triethylammonium salt as white crystals which melt at 198°.

b. By replacing the starting sulfonic acid in the above example by an equivalent amount of 4,4'-diamino-diphenylsulfide-2,2'-di-sulfonic acid and 30 g of the above-employed propionyl chloride, while otherwise following the same procedure as under (a), the compound of the formula

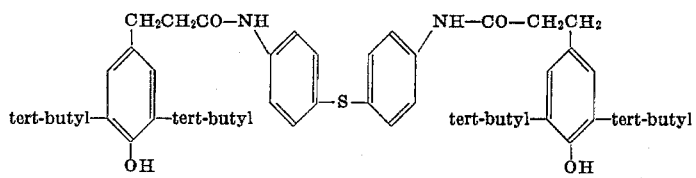

of similar properties as the final product obtained under (a) is produced.

Example 15 a. 6 g of 1,4-diaminonaphthalene-6-sulphonic acid are dissolved in 50 g of dimethyl acetamide. The solution is cooled to 0°–5° and a solution of 15 g of β-(4-hydroxy-3,5-di-tert.butylphenyl)-propionic acid chloride in 30 g of dimethyl acetamide is added dropwise within 15 minutes while stirring. 11 g of triethylamine are then added dropwise and the mixture is stirred for 12 hours at 0°–10°. The crystalline precipitate is filtered off, boiled up in 150 g of acetic acid and concentrated hydrochloric acid is added until it becomes opaque. It is cooled and filtered. The product is then boiled up in 100 g of acetic acid, filtered and cooled. The precipitated crystalline product is filtered off, washed with 30 g of acetic acid and dried in vacuo at 70°.

3 g of 1,4-bis-[(β-4-hydroxy-3,5-di-tert.butylphenyl)-propionylamino]-naphthalene-6-sulphonic acid are obtained in the form of white crystals which, after standing for 24 hours in the air, have taken up 2.36 mols of crystal water. The compound melts at 192° with foaming.

b. By replacing the starting sulfonic acid in the above example by an equivalent amount of
i. 1,3-diamino-benzene-4-sulfonic acid, or
ii. 2,5-diamino-2'-methyl-diphenylether-4-sulfonic acid, and using in each case 30 g of the propionyl chloride derivative and otherwise following the above-given procedure, there are obtained, respectively:
i. the compound of the formula

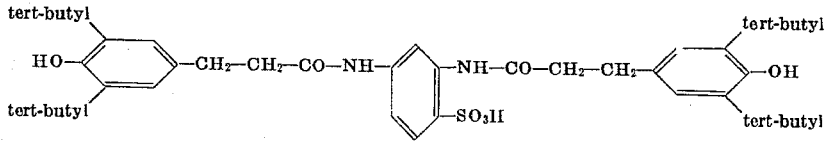

ii. the compound of the formula

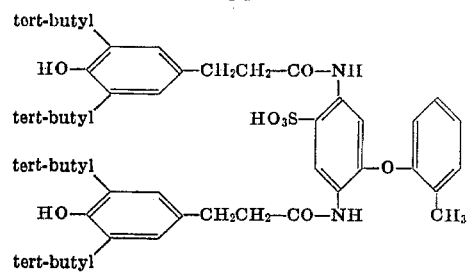

having similar products as the final product obtained under (a), supra.

Example 16

17 g of 2-amino-2',4'-dichlorodiphenyl ether-4-sulphonic acid are slurried in 170 g of chlorobenzene. 5.1 g of triethylamine are then added. A solution of 15 g of β-(4-hydroxy-3,5-di-tert.butylphenyl)-propionic acid chloride in 60 g of chlorobenzene is added dropwise within 15 minutes at room temperature. The whole is stirred for 30 minutes, 5.1 g of triethylamine are again added dropwise within 5 minutes and the mixture is stirred for 12 hours at room temperature. It is filtered and the dimethyl acetamide is evaporated in vacuo at 90°. 100 g of toluene are added to the remaining gel and gaseous hydrogen chloride is introduced for 15 minutes at 0°–10. The crystalline precipitate formed is filtered off and washed with toluene. The product is boiled up in 150 g of acetic acid, concentrated hydrochloric acid is added until it becomes opaque, it is cooled, filtered and again boiled up in 100 g of acetic acid. It is cooled, filtered and the compound is dried at 70° in vacuo.

In this way, 1.8 g of 2-(β-4-hydroxy-3,5-di-tert.butyl-phenyl)-propionylamino-2',4'-dichlorodiphenyl ether-4-sulphonic acid are obtained in the form of white crystals which, after standing for 24 hours in the air, take up 1.1 mols of crystal water. The compound melts at 142° with foaming.

Example 17

12.6 g of 1-amino-2-methoxynaphthalene-6-sulphonic acid are dissolved in 50 g of dimethyl acetamide. The solution is cooled to −8° to −10° and a solution of 15 g of β-(4-hydroxy-3,5-di-tert.butylphenyl)-propionic acid chloride in 30 g of dimethyl acetamide is added dropwise within 40 minutes while stirring. 11 g of triethylamine are then added dropwise and the mixture is stirred for 12 hours at 0°–10°. The precipitate formed is taken up in 100 g of distilled water and dissolved with 1N sodium hydroxide solution. It is then precipitated with concentrated hydrochloric acid, filtered and washed with distilled water. The product is dissolved twice in distilled water with the addition of sodium hydroxide and again precipitated with concentrated hydrochloric acid, filtered off, washed with distilled water and dried in vacuo at 70°.

2.7 g of 1-[β-(4-hydroxy-3,5-di-tert.butylphenyl)-propionyl-amino]-2-methoxynaphthalene-6-sulphonic acid are obtained in the form of white crystals which, after standing for 24 hours in the air, take up 1.12 mols of crystal water. The compound melts at 185° with foaming.

Example 18

7 g of 2-amino-2'-methyldiphenyl ether-4-sulphonic acid are dissolved in 50 g of isopropanol at 0°–5°. 7.5 g of diethyl aniline are added at the same temperature. A solution of 7.5 g of β-(4-hydroxy-3,5-di-tert.butylphenyl)-propionic acid chloride in 20 g of chlorobenzene is added dropwise while continuing stirring. The whole is stirred for 15 minutes at room temperature and finally refluxed for 5 minutes. It is then cooled and 15 g of concentrated hydrochloric acid and 50 g of distilled water are added while stirring vigorously. The oil formed is separated and again 15 g of concentrated hydrochloric acid and 50 g of distilled water are added. The crystalline precipitate is filtered off and boiled up in 100 g of acetic acid, filtered and cooled. The crystalline product is filtered off under suction, washed with 20 g of acetic acid and dried.

2.5 g of 2-(β-4-hydroxy-3,5-di-tert.butylphenyl)-propionyl-amino-2'-methyldiphenyl ether-4-sulphonic acid are obtained in the form of white crystals which, after standing for 24 hours in the air, take up 1.1 mols of crystal water.

Example 19 a. 2.8 g of 4-aminostilbene-2-sulphonic acid are dissolved in 20 g of dimethyl acetamide. 1.1 g of triethylamine are added dropwise and the mixture is cooled to 0°–5°. A solution of 3 g of β-(4-hydroxy-3,5-di-tert.butylphenyl)-propionic acid chloride in 20 ml of dimethyl acetamide is added dropwise within 10 minutes while continuing stirring. Another 1.1 g of triethylamine are then added dropwise. The whole is then stirred for 12 hours at room temperature and a mixture of 10 g of concentrated hydrochloric acid and 10 g of methanol is added. The crystalline precipitate is filtered off and boiled up in 60 g of acetic acid, filtered off and the product is dried in vacuo at 70°.

2.3 g of 4-3-(4-hydroxy-3,5-di-tert.butylphenyl)-propionyl-aminostilbene-2-sulphonic acid are obtained in the form of white crystals which, after standing for 24 hours in the air, only contain traces of crystal water. The compound melts at above 300°.

b. By replacing in the above example the starting sulphonic acid by an equivalent amount of 4,4'-diamino-stilbene-2,2'-disulfonic acid, and using the 6 g of the propionyl chloride derivative, which otherwise following the same procedure as given above, there is obtained the compound of the formula

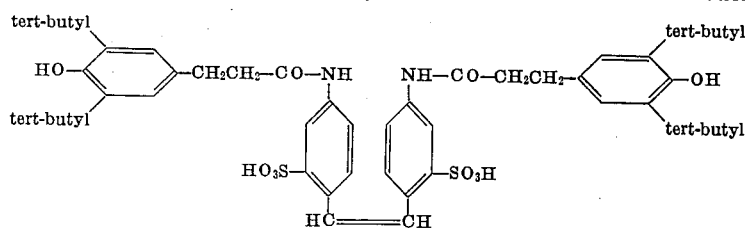

having similar properties as the final product produced under (a), supra.

Example 20

1.95 g of sodium salt of 2-methylaminoethane sulphonic acid (water content 11.5 percent) are dissolved in 50 ml of water and the pH of the solution is adjusted to 9 with dilute hydrochloric acid. A solution of 3.4g of N-(4-hydroxy-3,5-di-tert.butyl-phenyl)-phenyl urethane (produced from 2,6-di-tert.butyl-4-aminophenol and chlorocarbonic acid phenyl ester, M.P. 194°), in 50 ml of dioxan is added all at once. The mixture is heated to about 60° while stirring and the pH of the solution is kept between 8 and 9 by the addition of portions of 1N sodium hydroxide solution. After about 1 hour's reaction time, a sample completely dissolves on dilution with water. The dioxan is then removed from the solution in vacuo, the reaction is made acid to congo paper with hydrochloric acid and barium chloride solution is added hot. On cooling, the barium salt of N-(4-hydroxy-3,5-di-tert.butylphenyl)-N'-methyl-N'-(2-sulpho-ethyl)-urea precipitates.

Example 21

1.25 g of 2-aminoethane sulphonic acid are dissolved in 50 ml of water and the pH is adjusted to 8 with dilute sodium carbonate solution. This is reacted in the same way as described in example 20 with 3.4 g of N-(4-hydroxy-3,5-di-tert.butylphenyl)-phenyl urethane and, after the addition of barium chloride solution, the N-(4-hydroxy-3,5-di-tert.butylphenyl)-N'-(2-sulphoethyl)-urea formed is precipitated as the barium salt.

If the reaction of 2-aminoethane sulphonic acid with N-(4-hydroxy-3,5-di-tert.butylphenyl)-phenyl urethane is produced as has been described, but the solution, from which the dioxan has been removed, is acidified with dilute sulphuric acid instead of with hydrochloric acid, then, after the addition of an aqueous acetic acid solution of dicyclohexylamine, the dicyclohexyl ammonium salt of the product precipitates. It is filtered off, dried in vacuo and recrystallized from carbon tetrachloride when it then melts at 153°–155°.

Example 22

A methanolic slurry of 4-nitroso-2,6-di-tert.butylphenol is hydrogenated over a palladium active charcoal catalyst to form 2,6-di-tert.butyl-4-aminophenol. The operations described below are then performed under an atmosphere of nitrogen. A part of the solution which, after the catalyst has settled, is clear and colorless, corresponding to 0.02 mols of amine, is evaporated to dryness in vacuo. After the addition of 50 ml of dry benzene, it is again evaporated to dryness and this process is again repeated. A benzolic solution of crude 4-sulphobenzoyl chloride (corresponding to about 0.02 mols) and 2.4 g of pyridine is then added to the grey solid residue. A dark viscous oil which is insoluble in benzene is formed. The benzene solution is decanted therefrom. The last traces of benzene are removed from the oil in vacuo, water is added to bring on crystallization. After recrystallization from water, the pyridinium salt so obtained of 4-sulphobenzoic acid -(4-hydroxy-3,5-di-tert.butyl)-anilide melts at 262° with decomposition.

The benzene solution decanted from the insoluble pyridinium salt is evaporated to dryness in vacuo, the residue is taken up in dilute acetic acid and 3 ml of dicyclohexylamine are added. On dilution with water, the dicyclohexyl ammonium salt of the sulphonic acid precipitates. After recrystallization several times from ethanol, the white salt melts at 307° with decomposition.

A solution of the sodium salt of N-(4-hydroxy-3,5-di-tert-butyl-phenyl)-4-sulphobenzoyl amide is obtained when an equivalent amount of 1N sodium hydroxide solution is added to the dicyclohexyl ammonium salt and the dicyclohexylamine is distilled off with steam.

Example 23

11 g of 2-naphthylamine-6-sulphonic acid and 15 g of β-(4-hydroxy-3,5-di-tert.butylphenyl)-propionic acid chloride are reacted as described in example 5. The reaction mixture is stirred for 12 hours at 0°–10° and 50 g of concentrated hydrochloric acid are added while stirring vigorously. The precipitated precipitate is filtered off, boiled up in 100 g of acetic acid, filtered hot, cooled and filtered. It is again boiled up in 50 g of acetic acid and cooled. The product is filtered, washed with 15 g of acetic acid and dried in vacuo at 70°.

2.6 g of 2-N-[β-(4-hydroxy-3,5-di-tert.butylphenyl)-propionyl]-naphthylamine-6-sulphonic acid are obtained in the form of white crystals which, after standing for 24 hours in the air, have taken up 0.25 mols of crystal water. The compound melts at above 250° with foaming.

Example 24

11 g of 1-naphthylamine-4-sulphonic acid and a solution of 15 g of β-(4-hydroxy-3,5-di-tert.butylphenyl)-propionic acid chloride in 30 g of chlorobenzen are reacted as described in Example 5. The reaction mixture is stirred for 12 hours at room temperature and the crystalline precipitate is filtered off. The solvent is then distilled off in vacuo. The oil which remains is taken up in 100 g of chlorobenzene and gaseous hydrogen chloride is introduced for 20 minutes. The crystalline precipitate is filtered off, boiled up in 150 g of acetic acid, filtered and cooled. The product is filtered off, washed with 20 g of acetic acid and dried in vacuo at 70°.

4.7 g of 1-N-[β-(4-hydroxy-3,5-di-tert.butylphenyl)-propionyl]-naphthylamine-4-sulphonic acid are obtained in the form of white crystals which, after standing for 24 hours in the air, have taken up 1.75 mols of crystal water. The compound melts at 208° with foaming.

Example 25

22.3 g of 1-naphthylamine-4-sulphonic acid and 10.1 g of triethylamine are added to 700 g of dimethyl acetamide. The mixture is heated to 60° until a complete solution is attained, again cooled to 20° and, within 90 minutes, a solution of 32.9 g of S-(4-hydroxy-3,5-di-tert.butylbenzyl)-thioglycolic acid chloride in 50 g of o-dichlorobenzene and, thereafter, 10.1 g of triethylamine are added dropwise. The whole is stirred overnight, the solvent is evaporated in vacuo, the residue is dissolved in acetic acid and precipitated with about one quarter of the total volume of concentrated hydrochloric acid. The precipitate is filtered off and concentrated hydrochloric acid is added to the filtrate until precipitation occurs. After standing for 12 hours, the precipitate is filtered off under suction and recrystallized from acetic acid.

11.4 g of 1-[S-(4hydroxy-3,5-di-tert.butylbenzyl)-thio-acetylamino]-naphthalene-4-sulphonic acid are obtained which, after standing for several days in the air, has taken up 1 mol of crystal water. It melts at about 200° with foaming and decomposition.

Example 26

22.3 g of 1-naphthylamine-4-sulphonic acid and 20.2 g of triethylamine are added to 550 g of dimethyl acetamide. The mixture is heated to 60° to attain complete solution, cooled again to 20° and, within 2 hours, a solution of 24.8 g of 2-hydroxy-3-tert.butyl-5-methylbenzoyl chloride in o-dichlorobenzene is added dropwise. As suspension is formed and after the addition of another 10.1 g of triethylamine a clear solution is attained. After stirring for 12 hours, the solvent is removed in vacuo and the residue is dissolved in acetic acid. After 24 hours, the precipitate formed is filtered off under suction, the same volume of concentrated hydrochloric acid is added to the filtrate and this is left to stand for 3 hours. The precipitated 1-(2-hydroxy-3-tert.butyl-5-methyl-benzoylamino)-naphthalene-4-sulphonic acid is filtered off under suction and recrystallized from acetic acid. On standing in the air for 2 days, the pure product takes up 2 mols of crystal water and has an unclear melting point of over 190°.

Example 27

38 g of aniline-4-sulphonic acid and 60 g of β-(4-hydroxy-3,5-di-tert.butylphenyl)-propionic acid chloride are reacted as described in Example 6. The reaction mixture is stirred for 12 hours and the crystalline precipitate is filtered off. The solvent is evaporated in vacuo. The resin which remains is taken up in 300 g of acetic acid and gaseous hydrogen chloride is introduced into the solution at 0°–10° until saturation. The precipitated precipitate is filtered off and washed with 50g of acetic acid. The product is boiled up in 300 g of acetic acid, filtered and cooled, The precipitate is filtered off, washed with 30 g of acetic acid and dried in vacuo at 70°. In this way, 20.1 g of N-[β-(4-hydroxy-3,5-di-tert-butyl-phenyl)-propionyl]-amino-benzene-4-sulphonic acid are obtained in the form of white crystals which, after standing for 24 hours in the air, take up 1 mol of crystal water. The compound has an unclear melting point at 190°.

Example 28

22.3 g. of 2-naphthylamine-5-sulphonic acid are suspended in 200 g of dimethyl acetamide. 10.1 g of triethylamine are added whereupon solution is attained. This is cooled to 0°–5° and, within 15 minutes, an ice cold solution of 31 g of 4-hydroxy-3,5-di-tert.butylphenyl-acetyl chloride in 30 g of dimethyl acetamide as well as, subsequently, 10.1 g of triethylamine are added dropwise. The whole is stirred for 12 hours, completely evaporated in vacuo, the residue is taken up in acetic acid, about one quarter of the volume of concentrated hydrochloric acid is added and the whole is left to stand until the quantity of crystalline precipitate no longer increases. The precipitate is filtered off under suction, washed with acetic acid and recrystallized from acetic acid. In this way, 2-(4-hydroxy-3,5-di-tert.butylphenylacetamido)-naphthalene-5-sulphonic acid is obtained in the form of white crystals which melt at above 210° with foaming.

Example 29

9.5 g of 2-ethylaminomethyl-4-methyl-6-tert.butylphenol hydrochloride (produced by Einhorn reaction from N-ethyl-N-methylol urethane and 2-tert.butyl-p-cresol, alkaline saponification of the N-(2-hydroxy-3-tert.butyl-5-methyl-benzyl)-N-ethyl urethane formed and isolation as hydrochloride), are dissolved in 50 g of methanol. 1.95 g of sodium methylate are added and the whole is stirred for a short time and evaporated in vacuo. The residue is taken up in 100 g of toluene, 4.5 g of triethylamine are added to the solution and a solution of 9.5 g of 4-sulphobenzoyl chloride in toluene is added dropwise while cooling with ice. Another 4.5 g of triethylamine are then added. The whole is stirred for 6 hours at room temperature, filtered under suction, the filtrate is evaporated in vacuo, the oily residue is dissolved in 400 g of toluene, filtered and 5 g of dicyclohexylamine and 400 g of diethyl ether are added to the filtrate. The precipitated dicyclohexyl ammonium salt of N-(2-hydroxy-3-tert.butyl-5-methylbenzyl)-N-ethyl-p-sulphobenzamide is filtered off under suction and recrystallized from a mixture of toluene and a little ethanol. In this way, 5.5 g of amide are obtained, M.P. 149°–151°.

Example 30

13.5 g of 4-aminodiphenyl ether-3sulphonic acid and 15 g of N,N-diethyl aniline are added to 50 ml of isopropanol. The whole is cooled to 0°–10° and, at this temperature, 15 g of β-(4-hydroxy-3,5-di-tert.butylphenyl)-propionic acid chloride are added within 5 minutes. After the addition, the whole is stirred for room temperature for 15 minutes and then refluxed for 10 minutes. It is cooled to room temperature and 50 g of water and 15 g of concentrated hydrochloric acid are added to the reaction mixture. The oil which separates is decanted and taken up in 100 g of benzene. Water is removed from the organic phase by azeotropic distillation, the organic phase is cooled and the precipitate is filtered off. The product obtained is recrystallized twice from 100 g of benzene.

The 4-[β-(4-hydroxy-3,5-di-tert.butylphenyl)-propionyl-amido]-diphenyl ether-3-sulphonic acid is obtained in the form of white crystals which, after standing for 24 hours in the air, contain 1 mol of crystal water. The compound melts at above 200° with foaming.

Example 31

20 g of N-ethyl sulphanilic acid and 10 g of concentrated sodium hydroxide solution are dissolved in 200 g of distilled water. The solution is cooled to 0°–5° and, while continuing stirring, a solution of 15 g of β-(4-hydroxy-3,5-di-tert.butyl-phenyl)-propionic acid chloride in 50 g of acetone is added dropwise within 10 minutes. After stirring for 12 hours at room temperature, 50 g of concentrated hydrochloric acid are added while stirring vigorously, it is cooled to 0°–10°, filtered and washed with 30 g of hydrochloric acid. The product is then recrystallized from a mixture of acetic acid and water to which, when hot, a little concentrated hydrochloric acid has been added. In this way, 6.1 g of N-[β-(4-hydroxy-3,5-di-tert.butyl-phenyl)-propionyl]-N-ethylsulphanilic acid are obtained in the form of white crystals which, after standing for 24 hours, have taken up 1.35 mols of crystal water. The compound melts at about 180° with foaming.

Example 32

11 g of 1-naphthylamine-5-sulphonic acid and 10 g of triethylamine are added to 50 g of N,N-dimethyl acetamide.

The whole is cooled to 0°–10° and a solution of 15 g of β-(3,5-di-tert.butyl-4-hydroxyphenyl)-propionic acid chloride in 10 g of N,N-dimethyl acetamide is added dropwise within 15 minutes. The whole is stirred for 4 hours at 0°–5° and then for 12 hours at room temperature, 50 g of water and 20 g of concentrated hydrochloric acid are added to the reaction mixture, the mixture is distilled with steam and the precipitate formed is filtered off. The residue is dissolved in 100 g of water and 20 g of sodium acetate solution while hot and concentrated hydrochloric acid is added to the solution until it becomes opaque. It is cooled, the precipitated product is filtered off and recrystallized twice from a mixture of acetic acid and water.

4.5 g of 1-[β-(4-hydroxy-3,5-di-tert.butylphenyl)-propionylamido]-naphthalene-5-sulphonic acid are obtained in the form of white crystals which, after standing for 24 hours, take up 1.62 mols of water. The compound melts at about 204° with foaming.

Example 33

8 g of SO₃ are added at 0°–5° to 8.8 g of dioxan and 50 g of dry ethylene chloride. The reaction is exothermic and an amorphous precipitate is formed. A solution of 35.4 g of β-(4-hydroxy-3,5-di-tert.butylphenyl)-propionic acid anilide in 50 g of dioxan is than added dropwise at room temperature and the whole is stirred for 12 hours. The solvent is removed in vacuo and dilute hydrochloric acid is poured over the oil which remains. The crystalline precipitate formed is filtered off, dried, and purified by boiling up in toluene.

In this way, 25 g of N-[β-(4-hydroxy-3,5-di-tert.butyl-phenyl)-prioionyl]-aniline-4-sulphonic acid are obtained in the form of white crystals which, after standing for 24 hours in the air, take up 1 mol of crystal water and melt at about 190°. Thin layer chromatography proves this product to be identical with the compound obtained according to Example 27.

Example 34

15.85 g of 1-naphtahylamine-4-sulphonic acid are dissolved in a mixture of 400 g of dimethyl acetamide and 7.12 g of triethylamine at 60°. The solution is cooled to 15°–20° and, at this temperature, a solution of 19.3 g of β-(4-hydroxy-3,5-di-isopropylphenyl)-propionyl chloride in chlorobenzene is added dropwise. A fine precipitate precipitates. After stirring for 12 hours, the solvent is removed in vacuo, the residue is dissolved in acetic acid and a quarter of the volume of the solution of concentrated hydrochloric acid is added to it. After standing for some considerable time, the crystalline precipitate formed is filtered off under suction, washed with acetic acid and recrystallized from acetic acid.

In this way, 16 g of 1-N-[β-(4-hydroxy-3,5-di-isopropylphenyl)-propionyl]-naphthylamine-4-sulphonic acid are obtained which, after standing in the air, take up 1 mol of crystal water and melt at above 210° with decomposition.

Example 35

10 g of a Nylon 6 knitted fabric are treated for 30 minutes at a constant temperature of 80° in 250 ml of liquor which contains 100 mg of an antioxidant listed in Table I,
200 mg of a non-ionic, surface active wetting and levelling agent produced from 1 mol of stearyl alcohol and 18 mols of ethylene oxide, and
2.5 ml of glacial acetic acid.

The sample is then rinsed, dried and aged for 6 to 12 hours at 210° in a circulating air oven. The tensile strength is measured on 1 cm wide strips of sample before ageing and after ageing for 6 or 12 hours in the oven. The values obtained are summarized in Table I. As comparison, the values obtained with a blind sample are given. This was treated without antioxidant but otherwise in exactly the same way and aged.

TABLE I

| No. | antioxidant from example | tensile strength in kg before ageing | after 6 hrs ageing at 210° | after 12 hours ageing at 210° |
|---|---|---|---|---|
| 1. | 5 | 21.0 | 17.5 | 15.0 |
| 2. | 6 | 21.0 | 20.0 | 16.5 |
| 3. | 8 | 21.0 | 21.5 | 17.0 |
| 4. | 23 | 21.0 | 18.5 | 11.5 |
| 5. | 27 | 21.0 | 20.0 | 14.5 |
| 6. | without antioxidant | 21.0 | 6.0 | 4.5 |

In addition, 1 percent sulphuric acid solutions of the samples so obtained were produced before and after ageing for 6 or 12 hours and their relative viscosity (quotient from viscosity of solution and solvent) was measured. The values obtained are summarized in Table II and compared with the values of a blind sample.

TABLE II

| No. | antioxidant from example | relative viscosity before ageing | after 6 hours ageing at 210° | after 12 hours ageing at 210° |
|---|---|---|---|---|
| 1. | 5 | 2.35 | 2.28 | 2.32 |
| 2. | 6 | 2.35 | 2.35 | 2.14 |
| 3. | 8 | 2.35 | 2.25 | 2.12 |
| 4. | 23 | 2.35 | 2.23 | 2.05 |
| 5. | 27 | 2.35 | 2.23 | 2.22 |
| 6. | without antioxidant | 2.35 | 1.46 | 1.42 |

Example 36

10 g of a Nylon 6 knitted fabric are treated as described in Example 35 with one of the antioxidants listed in Table III. The samples so obtained are then aged for 6 hours at 210° in a circulating air oven and their tensile strength and relative viscosity are compared as given in Example 35 with the values of a sample treated and aged in the same way but without addition of antioxidant. The results are summarized in Table III

TABLE III

| No. | antioxidant from example | tensile strength in kg before ageing | after 6 h ageing at 210° | relative viscosity before ageing | after 6 h ageing at 210° |
|---|---|---|---|---|---|
| 1. | 1 | 21.0 | 16.5 | 2.35 | 2.20 |
| 2. | 2 | 21.0 | 8.5 | 2.35 | 1.65 |
| 3. | 3 | 21.0 | 12.5 | 2.35 | 1.95 |
| 4. | 4 | 21.0 | 10.0 | 2.35 | 1.63 |
| 5. | 7 (salt) | 21.0 | 19.0 | 2.35 | 2.11 |
| 6. | 7 (free acid) | 21.0 | 18.0 | 2.35 | 2.08 |
| 7. | 9 | 21.0 | 8.0 | 2.35 | 1.68 |
| 8. | 11 | 21.0 | 13.0 | 2.35 | 2.28 |
| 9. | 12 | 21.0 | 16.5 | 2.35 | 2.21 |
| 10. | 13 | 21.0 | 16.5 | 2.35 | 2.24 |
| 11. | 14 | 21.0 | 8.5 | 2.35 | 2.93 |
| 12. | 15 | 21.0 | 20.5 | 2.35 | 2.18 |
| 13. | 16 | 21.0 | 8.5 | 2.35 | 2.11 |
| 14. | 17 | 21.0 | 15.0 | 2.35 | 2.18 |
| 15. | 19 | 21.0 | 12.5 | 2.35 | 2.29 |
| 16. | 22 | 21.0 | 19.0 | 2.35 | 2.19 |
| 17. | 24 | 21.0 | 17.5 | 2.35 | 2.10 |
| 18. | without antioxidant | 21.0 | 6.0 | 2.35 | 1.46 |

Example 37

10 g of a Nylon 66 polyfilament of 4.1 g/den. are treated as described in Example 35 with the antioxidants listed in Table IV. The samples are then aged for 14 hours at 165° in a circulating air oven and their tensile strength is measured as described in Example 35, compared with the values of a sample treated and aged in the same way but without the addition of antioxidant. The results are summarized in Table IV.

TABLE IV

| No. | antioxidant from example | tensile strength in g before ageing | after ageing for 14 h at 165° |
|-----|--------------------------|-------------------------------------|-------------------------------|
| 1.  | 27                       | 95                                  | 85                            |
| 2.  | 6                        | 95                                  | 85                            |
| 3.  | 8                        | 95                                  | 76                            |
| 4.  | 19                       | 95                                  | 85                            |
| 5.  | without antioxidant      | 95                                  | 48                            |

Example 38

10 g of highly drawn Nylon yarn of 7.5 g/den, in 250 ml of a liquor which contains 100 mg of N-(4-hydroxy-3,5-di-tert. butylphenyl)-aniline-3-sulphonic acid, 200 mg of the wetting agent mentioned in Example 35 and 2.5 ml of glacial acetic acid, are quickly heated in a closed tube to 120° and cooled to 100° within 15 minutes. After opening the pressure tube, the yarn is rinsed, dried and subjected to oven-ageing at 200° for 2.5 hours in a circulating air oven. The yarn retains 82 percent of its tensile strength whilst the tensile strength of a control sample which has been treated in the same way but without the addition of the antioxidant mentioned above, sinks to 41 percent.

Example 39

10 g of a thread from a usual commercial, i.e. polyether urethane elastomer already containing stabilizer (Lycra, registered trade mark of Du Pont de Nemours, Wilmington, Delaware, USA) are treated as described in Example 35 with one of the antioxidants listed in Table V. The threads so obtained are aged for 30 hours at 120° in a circulating air oven and their tensile strength is compared with that of a sample treated and aged in the same way but without the additional addition of antioxidant. The results are summarized in Table V:

TABLE V

| No. | antioxidant from example | tensile strength in % after 30 h ageing at 120° |
|-----|--------------------------|--------------------------------------------------|
| 1.  | 6                        | 103                                              |
| 2.  | 23                       | 90                                               |
| 3.  | 27                       | 103                                              |
| 4.  | without antioxidant      | 59                                               |

Example 40

300 g of ε-caprolactam
0.3 g of sebacic acid
50 ml of water and
1 percent of one of the antioxidants given in Table VI are well mixed while heating. The mixture is put into an autoclave, the air therein is replaced by nitrogen, it is closed and heated to about 220°. A pressure of 20 – 25 excess atmospheres is attained inside the autoclave which is kept constant for about 30 minutes. It is then released to normal pressure, the temperature is simultaneously raised to 250°–255° and kept there for 15 – 18 hours. Threads are spun from the polymer so obtained which are aged for 2 hours at 200° in a circulating air oven. In the following Table VI, the retention of viscosity (in percent, measured in 1 percent sulphuric acid solution) of the threads so aged are compared with that of a control thread produced and aged without the addition of antioxidant:

TABLE VI

| No. | antioxidant from example | viscosity retention in % after 2 h ageing at 220° |
|-----|--------------------------|----------------------------------------------------|
| 1.  | 32                       | 86                                                 |
| 2.  | 27                       | 81                                                 |
| 3.  | without antioxidant      | 53                                                 |

Example 41

10 g of a yarn from an acrylonitrile-vinyl pyridine copolymer (Acrilan, registered trade mark of Chemstrand, USA) of 1.92 g/den are treated as described in Example 35 with the antioxidant produced according to Example 22. After ageing in an oven at 210° for 6 hours, the threads so obtained have 97 percent of their original tensile strength while the tensile strength of a yarn treated and aged in the same way but without the addition of antioxidant sinks to 82 percent.

We claim:

1. A compound of the formula

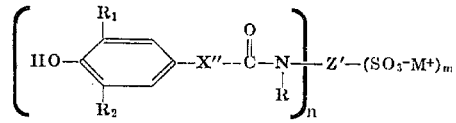

wherein
$R_1$ is alkyl group of from one to 12 carbon atoms, cyclohexyl, lower alkyl-cyclohexyl, benzyl or lower alkylbenzyl group,
$R_2$ is hydrogen or one of the groups represented by $R_1$, and $R_1$ and $R_2$ together have at least two carbon atoms,
X″ is a divalent bridge member selected from a single carbon-to-carbon bond, alkylene group of from one to five carbon atoms, —CH$_2$—S—CH$_2$— or —NH—, the latter being linked to C in the adjacent bridge member —CO—N—R,
R is hydrogen or alkyl group of from one to 18 carbon atoms,
m and n are each 1 or 2,
Z′ is, depending on the values of m and n, a divalent trivalent or tetravalent group selected from
 a. alkylene group of from two to five carbon atoms when each of m and n is 1,
 b. a divalent or trivalent benzene group when n is 1 and m is 1 or 2, or when m is 1 and n is 2, and
 c. a divalent, trivalent or tetravalent group selected from naphthylene, diphenyl ether, diphenyl thioether, stilbene or phenylene ethylene phenylene groups when each of m and n is 1 or 2,
any substituent in an aromatic ring of Z′ other than an $SO_3^-M^{+B}$ group being selected from bromine, chlorine, lower alkyl, lower alkoxy, hydroxy, lower alkanoylamino and —COO$^-$M$^+$— group, and
M$^+$ represents one equivalent of a cation selected from hydrogen ion, alkali metal ion, alkaline earth metal ion, ammonium ion, and hydrocarbyl-substituted, hydroxy-hydrocarbyl-substituted and oxa-hydrocarbyl-substituted ammonium ion.--

2. A compound as defined in claim 1, wherein $R_1$ represents branched alkyl of from three to 12 carbon atoms.

3. A compound as defined in claim 2 wherein

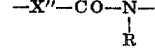

is

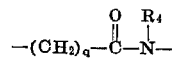

wherein
$R_4$ is hydrogen or lower alkyl, and
q is an integer ranging from 0 to 2.

4. A compound as defined in claim 3, wherein $R_1$ represents tertiary alkyl of from four to 12 carbon atoms.

5. A compound as defined in claim 4, wherein $R_1$ represents tert-butyl and $R_2$ represents hydrogen, methyl or tert-butyl.

6. A compound as defined in claim 4, wherein $q$ represents 2 and $R_4$ represents hydrogen.

7. A compound as defined in claim 4 wherein $Z'$ represents, depending on the values of $m$ and $n$, a divalent, trivalent or tetravalent group selected from (a) alkylene group of from two to five carbon atoms when each of $m$ and $n$ is 1, (b) a divalent or trivalent benzene group when $n$ is 1 and $m$ is 1 or 2, or when $m$ is 1 and $n$ is 2, and (c) a divalent, trivalent or tetravalent group selected from naphthylene, diphenyl ether, diphenyl thioether, stilbene or phenylene ethylene phenylene groups when each of $m$ and $n$ is 1 or 2.

8. A compound as defined in claim 5, wherein $m$ represents 1, and $Z'$ represents ethylene, a di- or trivalent radical of benzene or naphthalene or a divalent radical of diphenyl ether.

9. A compound as defined in claim 1, which is selected from N-(4-hydroxy-3,5-di-tert-butylbenzoyl)-aniline-3-sulphonic acid and a water-soluble salt thereof.

10. A compound as defined in claim 1, which is selected from 1-N[β-(4-hydroxy-3,5-di-tert-butyl-phenyl)-propionyl]-amino-naphthalene-8-sulphonic acid, and a water-soluble salt thereof.

11. A compound as defined in claim 1, which is selected from 1-N-[β-(4-hydroxy-3,5-di-tert-butylphenyl)-propionyl]-amino-benzene-3-sulphonic acid, and a water-soluble salt thereof.

12. A compound as defined in claim 1, which is selected from 2-N-[β-(4-hydroxy-3,5-di-tert-butylphenyl)-propionyl]-amino-diphenyl ether-4-sulphonic acid, and a water-soluble salt thereof.

13. A compound as defined in claim 1, which is selected from 2-N-[β-(4-hydroxy-3,5-di-tert-butylphenyl)-propionyl]-amino-ethane-1-sulphonic acid, and a water-soluble salt thereof.

14. A compound selected from 1-N-[β-(4-hydroxy-3,5-di-tert-butylphenyl)propionyl]-aminobenzene-1-sulphonic acid and a water soluble salt thereof.

* * * * *